United States Patent [19]

Elfert

[11] 4,383,923

[45] May 17, 1983

[54] SEMIPERMEABLE MEMBRANES

[75] Inventor: Klaus Elfert, Krefeld, Fed. Rep. of Germany

[73] Assignee: Bayer Aktiengesellschaft, Leverkusen, Fed. Rep. of Germany

[21] Appl. No.: 278,624

[22] Filed: Jun. 29, 1981

[30] Foreign Application Priority Data

Jul. 2, 1980 [DE] Fed. Rep. of Germany ....... 3025079
Dec. 13, 1980 [DE] Fed. Rep. of Germany ....... 3047083

[51] Int. Cl.³ .................... B01D 31/00; B01D 13/00
[52] U.S. Cl. ................................ 210/654; 210/500.2
[58] Field of Search .................. 548/264; 264/41, 49; 210/490, 654, 491, 500.2

[56] References Cited

U.S. PATENT DOCUMENTS 2,944,060 7/1960 Close et al. ..................... 548/264
4,262,094 4/1981 Johnson ......................... 264/41 X Primary Examiner—Frank A. Spear, Jr.
Attorney, Agent, or Firm—Connolly and Hutz

[57] ABSTRACT

Semipermeable composite membranes consisting of a microporous substrate and a semipermeable layer built of polymer material containing urazole structures.

6 Claims, No Drawings

SEMIPERMEABLE MEMBRANES

This invention relates to novel semipermeable membranes and their use in reverse osmosis and ultrafiltration.

Reverse osmosis and ultrafiltration are processes for the separation of substances. The separation of substances is effected in these separation processes by conveying the solution to be separated under pressure over the surface of a semipermeable membrane, the solvent and optionally a proportion of the dissolved substances penetrating through the membrane while the remaining components of the solution are retained on the surface of the membrane and are concentrated in the solution.

The separation of dissolved substances from the solvent by pressure filtration, for example the separation of salts from sea or brackish water for the recovery of fresh water or the separation of specific components from processing waters and production waste or the removal of undesirable substances from sewage, is a process which is becoming more and more important. In the past, the main membranes gaining commercial importance were those composed of cellulose esters, in particular cellulose acetate, or of polyamides and polysulphones. Cellulose acetate membranes are used commercially owing to their good throughput and their high separating capacity, although they have a number of disadvantageous properties which restrict their general applicability. These are inadequate resistance to chemicals, in particular their sensitivity to hydrolysis at a high or low pH value, and their susceptibility to decomposition by microorganisms. In the course of time, this leads to deterioration of the membrane properties.

Moreover, cellulose acetate membranes are restricted in use by their low heat resistance. Polyamide membranes have a higher resistance to alkalies or acids and solvents, but have a lower throughput than cellulose acetate membranes and can also be used only at relatively low temperatures. Membranes composed of polysulphones have a greater resistance to heat and chemicals than those composed of cellulose acetate and polyamides, but from polysulphones it is ony possible to produce permeable membranes which are not suitable for the separation of substances having a small particle size or having a low molecular weight such as, for example, salts.

According to their structure, the abovementioned membranes are integral-asymmetrical membranes which are characterised by a very thin but selective surface layer—the layer having the separating effect—in conjunction with a microporous under-layer (supporting layer) composed of the same plastics material.

The so-called composite membrane, also known as a combined or compound membrane, has a different structure in which a very thin polymer layer composed of a different material is applied as a selective membrane layer to a stable underlayer usually formed from a microporous membrane.

Composite membranes are obtained, for example, by bringing a microporous supporting membrane into contact, in succession, with solutions of the reaction components which form the membranes.

Membranes of this type are described, for example, in U.S. Pat. No. 4,039,440 or in Reverse Osmosis and Synthetic Membranes, Theory, Technology, Engineering; Sourirajan, S. 1977, page 249 et seq, and are produced by applying a polyethylene imine layer to a microporous substrate and reacting it with a solution of a polyfunctional compound and crosslinking it to form a thin film on the surface of the porous substrate. The membranes obtained in this way have the disadvantage of minimal resistance to oxidising agents (in particular chlorine) in the solution supplied. The numerous process stages are another disadvantage of this production process.

Other possible methods are described in U.S. Pat. No. 3,926,798 and German Offenlegungsschrift No. 2,904,979, wherein the membranes are produced directly on a substrate from soluble precursors.

According to German Offenlegungsschrift No. 2,904,979, attempts have been made to produce semipermeable membranes from polymers having a triisocyanurate structure, but it is necessary according to this process to convert the corresponding monomeric compounds with triisocyanurate structure and soluble precursors thereof into the polymer at high temperatures. It is known from investigations (J. Chem. Soc. 1961, 3148 and U.S. Pat. No. 2,580,468) that compounds having a triisocyanurate structure of the type used in German Offenlegungsschrift No. 2,904,979 may be subject to decomposition or reversion at high temperatures.

Consequently, there are not yet available any membranes with high water permeability as well as good selectivity toward substances having low molecular weights and without the above described disadvantages of the known membranes.

There is therefore a need to develop membranes which, in addition to high permeability and selectivity, have high resistance to chemical, in particular oxidative, and biological decomposition and, in particular, high resistance to heat. An object of the present invention is to provide a semipermeable membrane which can be used for reverse osmosis and ultrafiltration and which avoids the disadvantages of the membranes described above.

It has surprisingly been found that semipermeable compound membranes which have a selective membrane layer based on polymers containing urazole structures possess the desired properties.

This invention thus provides semipermeable composite membranes which consist of at least one microporous supporting membrane and at least one selective membrane layer and which are characterised in that the selective membrane layer is composed of polymers having urazole structures.

The polymers having urazole structures are obtained by polycondensation of at least one compound corresponding to the general formula (I) and/or water-soluble reaction products thereof:

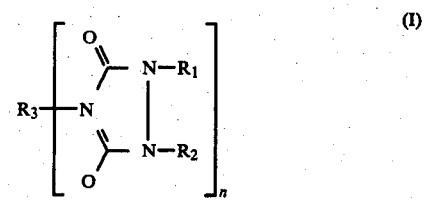

wherein $R_1$, and $R_2$ are the same or different, and represent hydrogen or a $C_1$-$C_4$ alkyl radical and $R_3$ represents hydrogen, a $C_1$-$C_{10}$ aliphatic radical and at least two of the radicals $R_1$, $R_2$ and $R_3$ represent a radical corresponding to the general formula:

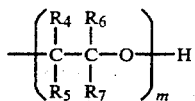

in which $R_4$, $R_5$, $R_6$, $R_7$, which may be the same or different independently of each other, represent hydrogen or a $C_1$-$C_4$ alkyl radical, preferably hydrogen or methyl, m represents an integer from 1 to 10, preferably from 1 to 3 and n represents 1 or 2, or $R_1$, $R_2$ and $R_3$ represent a glycidyl radical.

Examples of compounds corresponding to the general formula (I) include the following compounds:

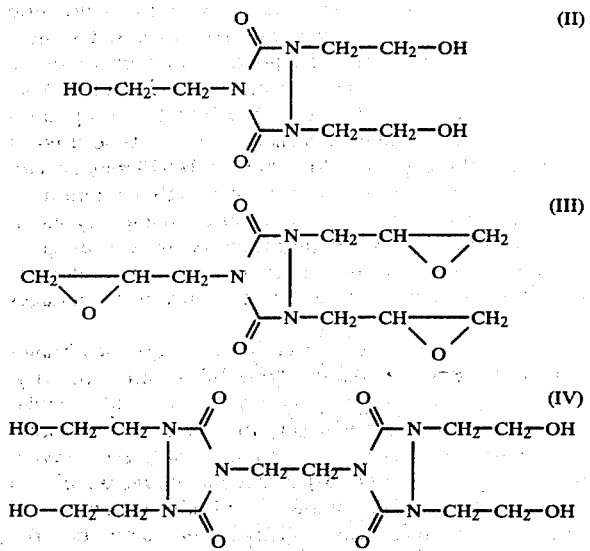

Trishydroxyethylurazole (II), hereinafter also designated as THEU, is particularly preferred in the context of the invention.

Examples of water-soluble reaction products of compounds corresponding to formula (I) include condensation products which are obtained by heating a compound according to formula (I) in the presence of an acidic catalyst. The water-soluble reaction products thus obtained can also be used for membrane production.

According to the invention, comonomers containing hydroxyl groups can also be used in addition to the compounds corresponding to formula (I) or the water-soluble reaction products thereof for the production of polycondensates used for the inventive semipermeable membranes.

Examples of such compounds include alcohols such as furfuryl alcohol, tetrahydrofurfuryl alcohol, benzyl alcohol or aldehydes such as formaldehyde, furfuryl aldehyde or benzaldehyde.

Additional comonomers include also polyols such as, for example, ethylene glycol, diethylene glycol, polyethylene glycol, butane diol, glycerine, trimethylol propane, pentaerythritol, sorbitol, mannitol, dianhydrosorbitol, also hydroxycarboxylic acids such as citric acid, tartaric acid, glycolic acid and/or alkoxymethyl melamines such as, for example, hexamethoxymethyl melamine.

It is also possible to use two or more of the above-mentioned compounds as comonomers.

It has surprisingly been found that, when using copolymers of a monomer according to formula (I) or a water-soluble reaction product and one or more of the above-mentioned monomers, membranes with good retention of dissolved substances and good water-permeability are obtained. It is therefore preferred in the context of the invention to react the monomers according to formula (I) or its water-soluble reaction products with at least one comonomer from the group of compounds mentioned above. However, furfuryl alcohol, formaldehyde and ethylene glycol are particularly preferred as comonomers.

The relative proportion of the compound having a urazole structure and the copolymerisable compounds can vary, depending on the desired membrane properties. The proportion of compounds according to formula (I) and their water-soluble reaction products amounts to at least approximately 20% by weight, preferably from 20 to 80% by weight, based on the total quantity of monomers used.

The semipermeable composite membrane according to the invention consists of a polymer containing urazole structures on a suitable substrate.

According to the invention, a thin selective film consisting of a polymer containing urazole structures is formed on a microporous substrate material the substrate being firstly treated with a solution containing at least one compound corresponding to formula (I) or a water-soluble reaction product thereof as well as optionally one or more comonomers from the group of compounds mentioned above, and the coated substrate being subjected to a heat treatment in the presence of an acidic catalyst, whereby the monomers condensate.

According to the invention, the composite membranes are preferably produced in such a way that a coating solution is produced which is applied as coating on a suitable substrate material and the coated substrate is heated at a temperature of from about 90 to 190° C., preferably from 100 to 170° C., for a period of from about 1 to 30 minutes, whereby the coating crosslinks.

The coating solution is produced at room temperature from the monomers and a suitable solvent. Water or mixtures of water and alcohols, such as methanol, ethanol or isopropanol, are preferably used as solvents.

The concentration of the compound corresponding to formula (I) or the water-soluble reaction products thereof in the solution can vary depending on the properties of the desired membrane. The concentration of these compounds generally lies between 0.1 and 10% by weight, preferably from 0.5 to 8% by weight.

The catalysts needed for the production of the polymers include acids and acid-forming substances. Examples of such catalysts include mineral acids such as sulphuric acid, phosphoric acid, hydrochloric acid as well as organic acids such as benzene sulphonic acid or toluene sulphonic acid.

The ratio of acid catalyst to the monomers is generally from 1:20 to 1:1 by weight.

The addition of surface-active agents to the coating solution to improve the wetting of the substrate and to achieve a uniform coating has also proved to be advantageous. Suitable surface-active agents include, for example, anionic surface-active agents such as alkane sulphonates, alkylaryl sulphonates, fatty alcohol sulphates or non-ionogenic surface-active agents such as alkyl phenol polyglycol ethers or fatty alcohol polyethers.

The solution produced in this way is used for the coating of a microporous substrate for the information of a semipermeable composite membrane.

The microporous substrates are known per se. Any suitable substrate material can be used for the membranes according to the invention. Preferred microporous substrates include those produced from polysulphones, sulphonated polysulphone, polyvinyl chloride or polyphenylene oxide. A polysulphone has proved to be a particularly serviceable substrate material for the membranes according to the invention. The production of the microporous substrate from polysulphone is described, for example, in Office of Saline Water Research and Development Progress Report No. 359, Oct. 1968. Moreover, the substrate used can be additionally reinforced on its rear by a fibrous web, paper or woven material. Such reinforcing materials can be produced from polyethylene, polypropylene, polyester or polyamide.

The coating of the substrate can be carried out by known processes such as painting, brushing, casting and spraying or simply by immersing the substrate in the coating solution.

The coated substrate material is subjected to heat treatment using a hot air stream or in a drying cabinet. During the heat treatment, the components of the coating solution polymerise and crosslink on the substrate. Both the duration of the heat treatment and the temperature can be varied, depending on the composition of the coating solution as well as the desired membrane properties. The duration of the heat treatment generally lies between 1 and 30 minutes and the temperature lies between 90 and 190° C.

The membranes according to the invention are suitable for the separation and concentration of substances by reverse osmosis and ultrafiltration.

The membranes can be used for the desalination of sea water or brackish water or for the treatment of industrial process waters and production waste for the separation of organic materials.

Semipermeable membranes according to the invention are particularly suitable for the applications described as they exhibit very good retention of salt and small organic molecules, possess high water permeability as well as high stability against hot solutions and, in particular, stability against hydrolysis and oxidation.

To determine the properties of the membrane, the finished membrane is placed on a porous metal sinter plate and inserted into a pressure filtration apparatus in which the test solutions are pumped at room temperature under the specified pressures over the membrane surface. The pump output is about 15 l/h.

The filtration performance of the membrane is indicated in liters/m² per day. The percentage retention is usually indicated as follows:

$$\text{Retention} = \left(1 - \frac{\text{Concentration of dissolved substance in the filtrate}}{\text{Concentration of dissolved substance in the starting solution}}\right) \cdot 100\ (\%)$$

PRODUCTION OF THE MICROPOROUS SUBSTRATE

A casting solution containing 15% of a polysulphone (Udel P 3500 ® Union Carbide) in dimethyl formamide was produced. The solution was applied in a layer thickness of 0.25 mm at room temperature to a polyester web (weight per unit area: 180 g/m²). The polysulphone layer was then coagulated in water at room temperature containing 0.5% by weight of sodium dodecyl sulphate. A fibre-web-reinforced microporous polysulphone membrane which was used as a substrate for the composite membranes in the following Examples was obtained.

EXAMPLE 1

23.3 g of trishydroxyethylurazole and 3 g of water were heated for 10 minutes to 130° C. with stirring. The temperature was raised to 140° and 0.5% by weight of sulphuric acid added and the mixture was stirred for a further 10 minutes at this temperature. After cooling, a water-soluble viscous resin having a light brownish colour was obtained.

A moist substrate membrane was immersed for 10 minutes at room temperature in an aqueous solution containing 3% by weight of this condensation resin, 0.5% by weight of Na-dodecylsulphate and 0.1% by weight of sulphuric acid. The coated film was then removed and held vertically for one minute in order to allow excess solution of run off. The film was then suspended for 20 minutes at 150° C. in a drying cabinet. The finished membrane was tested with a 3.5% by weight NaCl solution under a pressure of 90 bar. The performance of this membrane was a throughput of 245 l/m² d and a salt retention of 84%.

EXAMPLE 2

An aqueous solution containing 1% by weight of trishydroxyethylurazole, 2% by weight of furfuryl alcohol, 4% by weight of sulphuric acid, 1% by weight of Na-dodecyl sulphate as well as 20% by weight of isopropanol was produced and filtered prior to use. A moist substrate membrane which had been produced in the manner already described was immersed into this coating solution for 10 minutes at room temperature. The membrane was removed and held vertically for one minute so that excess solution could run off. The coated substrate membrane was treated in a drying cabinet at 140° C. for a period of 30 minutes.

The combined membrane obtained was tested with a 3.5% by weight solution of NaCl at a pressure of 90 bar. The throughput was 490 l/m² per day and the salt retention was 99.2%.

EXAMPLE 3

The membrane was produced in the same way as in Example 2 except that no isopropanol was used. This membrane gave the following values during testing:

| | |
|---|---|
| Charge solution: | 3.5% by weight NaCl |
| Pressure: | 90 bar |
| Throughput: | 500 l/m³ per day |
| Retention: | 99.4% |

EXAMPLES 4 to 17

The results of membranes obtained using various comonomers according to the same production method as in Example 2 are complied in the following Table.

| Example | THEU % by weight | Comonomer % by weight | $H_2SO_4$ % | Iso-propanol % | Drying Conditions (°C./Min) | Throughput ($l/m^2 d$) | Retention (%) |
|---|---|---|---|---|---|---|---|
| 4 | 4 | FA/ethylene glycol - 2/2 | 4 | 20 | 150/30 | 580 | 98.8 |
| 5 | 1 | FA/PEG - 2/1 | 2 | — | 150/15 | 210 | 98.6 |
| 6 | 1 | FA/DEG - 2/1 | 2 | 20 | " | 620 | 98.7 |
| 7 | 1 | FA/trimethylol-propane - 2/1 | 2 | 20 | " | 250 | 97.8 |
| 8 | 1 | FA/pentaerythritol - 2/1 | 2 | 20 | " | 265 | 98.1 |
| 9 | 1 | FA/mannitol - 2/1 | 2 | 20 | " | 550 | 98.9 |
| 10 | 4 | FA/dianhydrosorbitol - 2/2 | 4 | 20 | " | 580 | 98.7 |
| 11 | 1 | FA/benzyl-alcohol - 2/1 | 2 | 20 | 150/20 | 150 | 98.2 |
| 12 | 1 | FA/citric acid - 2/1 | 2 | — | 150/15 | 270 | 97.2 |
| 13 | 1 | FA/furfuryl aldehyde - 2/1 | 2 | 20 | " | 390 | 99.2 |
| 14 | 1 | FA/benzaldehyde - 2/1 | 2 | 20 | " | 300 | 98.4 |
| 15 | 1 | FA/TGUZ - 2/1 | 2 | 20 | " | 490 | 98.7 |
| 16 | 1 | FA/hexamethoxy-methylolmelamine - 2/1 | 2 | 20 | " | 320 | 99.1 |
| 17 | 1 | FA/butane diol-1,4- 2/1 | 2 | 20 | " | 280 | 96.5 |

FA = furfuryl alcohol,
PEG = polyethyleneglycol MG 4000,
DEG = diethyleneglycol,
TGUZ = trisglycidylurazole.
Test conditions: 3.5% NaCl and 90 bar

EXAMPLE 18

23.3 g of THEU and 12.2 g of a formalin solution (35% by weight) were heated to 100° C. and stirred for 30 minutes at this temperature. The mixture was left to cool and the aqueous solution was concentrated under vacuum at 60° C. 25.9 g of a slightly yellowish water-soluble condensation product remained. Using this resin, an aqueous coating solution containing 4% by weight of the resin, 0.7% by weight of Na-dodecylsulphate and 0.2% by weight of sulphuric acid was produced. Testing at 90 bar and 3.5% by weight NaCl.

Throughput: 140 $l/m^2 d$
Retention: 95%

EXAMPLE 19

An aqueous coating solution containing 1% by weight of a compound corresponding to the formula

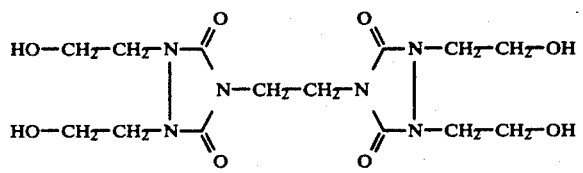

2% by weight of furfuryl alcohol, 2% by weight of sulphuric acid and 20% by weight of isopropanol was used for coating the substrate membrane. The heat treatment was carried out for 30 minutes at 150° C.

Charge solution: 3.5% NaCl
Pressure: 90 bar
Throughput: 420 $l/m^2 d$
Retention: 97.7%

EXAMPLE 20

A membrane produced according to Example 4 was charged with a 0.7% by weight aqueous solution of caprolactam under a pressure of 40 bar. Under the specified conditions, the membrane had a solute retention exceeding 99% and a throughput of 420 $l/m^2 d$. The concentration of the dissolved substance was determined by analysis of the total carbon content.

EXAMPLE 21

A membrane according to Example 2 having a throughput of 490 $l/m^2 d$ and a salt retention of 99.2% was charged with an aqueous charging solution of 3.5% by weight of NaCl plus 150 ppm of chlorine, and the performance was retained even after 90 hours.

EXAMPLE 22

A membrane according to Example 2 with a throughput of 490 $l/m^2 d$ and 99.2% retention (3.5% NaCl by weight, 90 bar) was treated for 90 hours with water at 80° C., and no deterioration of the throughput could be determined after the experiment, the salt retention exceeding 95%.

COMPARISON EXAMPLE

An aqueous coating solution was produced from 2% by weight of furfuryl alcohol, 2% by weight of sulphuric acid as well as 20% by weight of isopropanol with the addition of 1% by weight of sodium dodecylsulphate. The production method was the same as in the preceding Examples and the drying conditions were 20 minutes at 140° C. The finished membrane was tested in the specified testing apparatus with a 3.5% by weight NaCl solution and at a pressure of 90 bar. This membrane exhibited the following properties:

Throughput: 320 l/m²d
Retention: 90.5%

I claim:

1. Semipermeable compound membranes consisting of at least one microporous substrate membrane and at least one semipermeable layer, wherein said semipermeable layer consists of a polymer material which has urazole structures and is the polycondensation product of at least one compound corresponding to the formula:

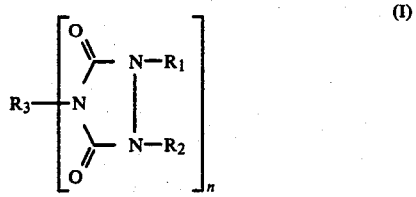

and/or at least one water-soluble reaction product thereof, wherein $R_1$ and $R_2$, which may be the same or different or represent hydrogen or a $C_1$-$C_4$ alkyl radical and $R_3$ represent hydrogen, a $C_1$-$C_{10}$ aliphatic radical and at least two of the radicals $R_1$, $R_2$ and $R_3$ represent a radical corresponding to the formula

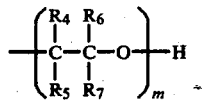

in which $R_4$, $R_5$, $R_6$ and $R_7$, which may be the same or different independently of each other, represent hydrogen or a $C_1$-$C_4$ alkyl radical, m represents an integer from 1 to 10 and n represents 1 or 2, or $R_1$, $R_2$ and $R_3$ represent a glycidyl radical.

2. A membrane as claimed in claim 1, wherein the compound corresponding to formula (I) is trishydroxyethylurazole and/or trisglycidylurazole.

3. A membrane as claimed in claim 1, wherein the polymer material is the polycondensation product of at least one compound corresponding to formula (I) and/or a water-soluble reaction product thereof with at least one comonomer selected from the group consisting of alcohols, aldehydes, polyols with $C_2$-$C_8$, polyethylene oxides, hydroxycarboxylic acids containing from 2 to 17 carbon atoms and alkoxymethyl melamines.

4. A membrane as claimed in claim 3, wherein the comonomer is at least one member of the group consisting of furfuryl alcohol, tetrahydrofurfuryl alcohol, benzyl alcohol, formaldehyde, furfuryl aldehyde, benzaldehyde, ethylene glycol, diethylene glycol, polyethylene glycol, butane diol, glycerine, trimethylol propane, pentaerythritol, sorbitol, mannitol, dianhydrosorbitol, citric acid, tartaric acid, glycolic acid and hexamethoxymethyl, melamine.

5. A membrane is claimed in claim 1, wherein the proportion of compounds according to formula (I) and/or their water-soluble reaction products amounts to at least approximately 20% by weight, based on the total quantity of monomers used to produce the polymer material.

6. Desalination of sea water of brackish water or separation of organic materials from industrial process waters or production water by reverse osmosis or ultrafiltration, wherein membranes are used as claimed in claim 1.

* * * * *